UNITED STATES PATENT OFFICE.

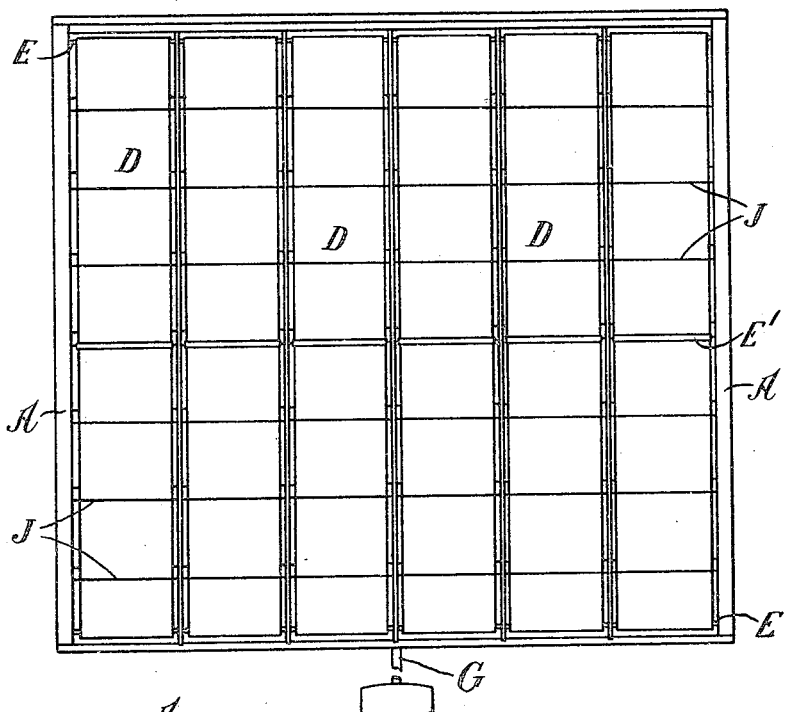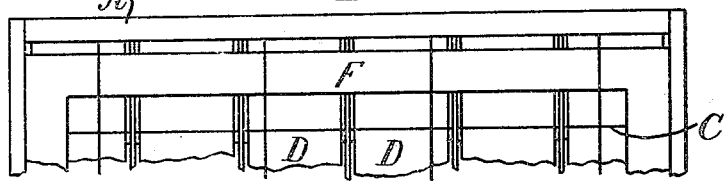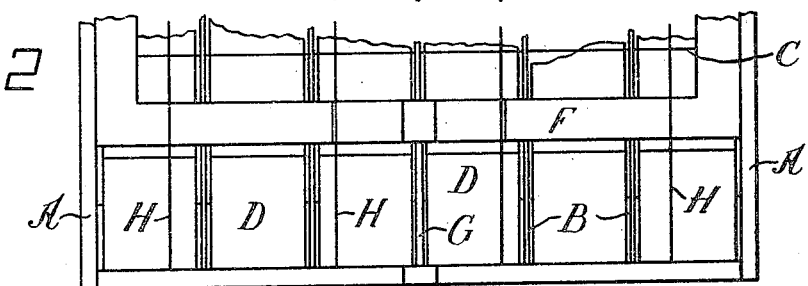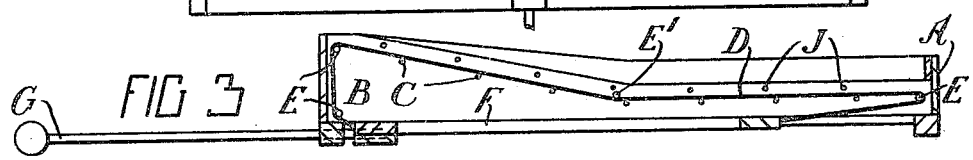

THOMAS COWBURN, OF CHURCHDOWN, NEAR CHELTENHAM, ENGLAND.

INCUBATOR.

1,137,582.  Specification of Letters Patent.  Patented Apr. 27, 1915.

Application filed July 1, 1912. Serial No. 707,092.

*To all whom it may concern:*

Be it known that I, THOMAS COWBURN, a subject of the King of Great Britain, residing at Churchdown, near Cheltenham, England, have invented new and useful Improvements in and Appertaining to Incubators, of which the following is a specification.

This invention has reference to improvements in and appertaining to incubators of that type in which the eggs may be simultaneously turned in a tray by the movement of a surface or band on which the eggs bear.

It has been found that temperatures taken at different points on a horizontal plane in an incubator vary considerably according to the position at which the heated air is admitted, and the main object of my invention is to provide an incubator of the aforesaid type wherein all the eggs are positioned so that they are subjected to an equable temperature and turned regularly to the same extent when the movable surface or band is displaced, thereby insuring that all will hatch at substantially the same time.

My invention consists essentially in an incubator egg-tray or the like in which each egg is supported independently in a compartment of the tray and egg-turning bands are carried at definite predetermined varying heights from the floor or bottom of the incubator, the said heights being predetermined from the conditions that govern the temperature at the various points within the incubator.

An important feature of the invention is that the egg-turning bands are guided between transverse supporting wires and transverse rods which keep the said bands down upon the said wires at the points where the angle of inclination of the bands are changed: I do not simply allow the bands to sag to contact with supporting wires arranged at different heights as has been proposed, and, on the other hand, I wish it to be understood that I make no claim *per se* to the arrangement of supporting wires in an inclined plane.

An additional feature of importance is that the supporting wires are mounted toward one side of the compartment, and not centrally thereof nor directly under the upper wires forming the transverse partitions that separate the eggs in the same row, the object of this construction being to cause the egg to bear normally against the supporting wire and one only of the two separating wires and to allow the band to conform somewhat to the contour of the egg and increase the frictional contact between the egg and the band.

In the accompanying drawing, I have illustrated one form of my invention.

In said drawings: Figure 1 represents a top plan view; Fig. 2 shows a bottom plan view; and Fig. 3 is a sectional view of the device.

Referring to the drawing, A represents a frame or the like which is preferably constructed to slide into the incubator. Within the frame and at suitable distances apart I place a number of partitions B or the like. Between the said partitions and supported on wires C or metal rods I mount strips D preferably of ribbed cloth or other suitable material. For the purpose of reducing friction and guiding the strips I pass the latter over rollers E located at each end of the frame and fasten the ends of said strips in any suitable manner to a frame F or equivalent. Said frame F is capable of longitudinal movement preferably by means of a detachable rod G which passes through a hole or aperture in the frame A. The frame F is supported from the frame A by wires H or the like. When it is desired to turn the eggs the rod or key G is inserted through the aperture in the frame A and made to engage in any known suitable manner with the frame F which latter may be either pushed forward or pulled backward by means of the rod or key thereby causing the strips D to travel in a forward or backward direction and thereby rotate the eggs resting thereon. For the purpose of maintaining the eggs and to keep them separate one from the other I provide rods or wires J or the like running across the bands or strips D and carried by the partitions B.

As shown in Fig. 3 the strips or bands D may have one part horizontal (as shown at the right hand side) and the other part may be slightly inclined (as shown at the left hand side) this being attained by providing rods or rollers E′ extending across the bands, and fixing the upper rollers E at the left hand side higher up in the frame. By this means the left hand part of the band will be at a greater height from the floor level of the incubator and by this manner of construction the eggs may be so carried that all of them will be subjected to an equable temperature, the particular construction depending upon the position of the heating device—for example, if the heating device is arranged centrally, the bands may be inclosed at both sides of the tray and horizontal in the center, instead of being inclined at one side only as shown in Fig. 3.

It will be noted that the egg supporting wires C are situated at one side of the compartments formed between the wires J. The advantage of this construction is that whenever an egg is placed in any compartment, the weight of the egg will cause the band D to sag slightly between the egg-supporting wire C and the wire J at the opposite side of the compartment. The egg will thus be held against said opposite side J and the band will conform to the contour of the egg. All of the eggs in any row are thus held at the same side of the compartments and when the eggs are turned by movement of the band D they are thus prevented from coming in contact with each other.

What I claim as my invention and desire to secure by Letters Patent is:—

1. An incubator egg-tray comprising a frame, partitions extending across the frame to separate the latter into spaces each adapted to receive a row of eggs, a plurality of egg-separating wires extending transversely of said partitions to form egg-receiving spaces, each of a size to receive an individual egg, a plurality of egg-supporting wires extending parallel to the egg-separating wires below the latter and traveling bands resting on the egg-supporting wires and on which the eggs are sustained, each egg-supporting wire being situated at one side of the center of the corresponding compartment whereby the eggs in each row are prevented from contacting with each other.

2. An incubator egg-tray comprising a frame, a plurality of partitions extending across the frame, a plurality of egg-separating wires extending transversely of the partitions to form egg-receiving spaces each adapted to receive an individual egg, a plurality of egg-supporting wires extending parallel to the egg-separating wires, traveling bands resting on the egg-supporting wires and forming the bottom of the egg-receiving spaces, a portion of the egg separating wires and egg-supporting wires being arranged in a horizontal plane and the remaining wires being arranged in an inclined plane and a hold-down wire E' engaging the top of the traveling bands at the point where the angle of inclination is changed, whereby the spaces between the partitions have a horizontal portion and an inclined portion.

In testimony whereof I have signed my name to this specification in the presence of two subscribing witnesses.

THOMAS COWBURN.

Witnesses:
RICHARD CASTLE,
E. J. BUSSELL.

Copies of this patent may be obtained for five cents each, by addressing the "Commissioner of Patents, Washington, D. C."